United States Patent
Kadiri et al.

(10) Patent No.: US 11,277,792 B2
(45) Date of Patent: Mar. 15, 2022

(54) METHODS AND APPARATUS FOR REPORTING APERIODIC CQI IN A NEW SCELL STATE OF LTE CARRIER AGGREGATION

(71) Applicant: QUALCOMM Incorporated, San Diego, CA (US)

(72) Inventors: Prasad Reddy Kadiri, San Diego, CA (US); Alberto Rico Alvarino, San Diego, CA (US); Umesh Phuyal, San Diego, CA (US); Wanshi Chen, San Diego, CA (US); Supratik Bhattacharjee, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 16/190,903

(22) Filed: Nov. 14, 2018

(65) Prior Publication Data

US 2019/0159126 A1  May 23, 2019

Related U.S. Application Data

(60) Provisional application No. 62/588,119, filed on Nov. 17, 2017.

(51) Int. Cl.
*H04W 52/02* (2009.01)
*H04L 1/00* (2006.01)
(Continued)

(52) U.S. Cl.
CPC ....... *H04W 52/0216* (2013.01); *H04L 1/0026* (2013.01); *H04L 1/0027* (2013.01);
(Continued)

(58) Field of Classification Search
CPC ..... H04L 5/001; H04L 5/0057; H04L 5/0053; H04L 1/0026; H04W 72/0413; H04W 72/0446
See application file for complete search history.

(56) References Cited

U.S. PATENT DOCUMENTS

2013/0148535 A1* 6/2013 Baghel ............... H04L 5/001
370/252
2014/0056243 A1* 2/2014 Pelletier ............. H04L 5/0032
370/329

(Continued)

OTHER PUBLICATIONS

Ericsson: "Shortened TTI and Short Processing Time—Collection of RAN1 Agreements Sorted Per Topic," 3GPP Draft; R1-1719213, RAN1 Agreements Per Topic (STTI and SPT) Revision of R1-1714998, 3rd Generation Partnership Project (3GPP), Mobile Competence Centre; 650, Route Des Lucioles; F-06921 Sophia, vol. RAN WG1, No. Prague, Czech Rep; Oct. 9, 2017-Oct. 13, 2017, Oct. 18, 2017, XP051353688, 26 pages, Retrieved from the Internet: URL: http://www.3gpp.org/ftp/tsg_ran/WG1_RL1/TSGR1_90b/Docs/.

(Continued)

*Primary Examiner* — Jung H Park
(74) *Attorney, Agent, or Firm* — Patterson + Sheridan, L.L.P.

(57) ABSTRACT

Certain aspects of the present disclosure relate to methods and apparatus for reporting aperiodic channel quality indicator (A-CQI) in a new Secondary Cell (SCell) state of Long Term Evolution (LTE) carrier aggregation. A User Equipment (UE) receives a request for reporting A-CQI relating to a Scell configured for the UE when the UE is in a first state corresponding to the Scell, the first state designed for a reduced SCell activation latency and to result in the UE using lower power as compared to when the UE is in a second state. The UE, in response to the request, reports the A-CQI for the Scell in accordance with a first A-CQI reporting configuration for the first state which is different from a second A-CQI reporting configuration for the second state.

25 Claims, 11 Drawing Sheets

(51) Int. Cl.
*H04W 24/10* (2009.01)
*H04L 5/00* (2006.01)
*H04L 5/14* (2006.01)
*H04W 72/08* (2009.01)
*H04W 56/00* (2009.01)

(52) U.S. Cl.
CPC ............ *H04L 5/005* (2013.01); *H04L 5/0057* (2013.01); *H04L 5/0091* (2013.01); *H04L 5/14* (2013.01); *H04W 24/10* (2013.01); *H04W 52/0206* (2013.01); *H04W 72/085* (2013.01); *H04L 5/1469* (2013.01); *H04W 56/001* (2013.01)

(56) References Cited

U.S. PATENT DOCUMENTS

| | | | |
|---|---|---|---|
| 2016/0128003 A1* | 5/2016 | Callender | H04W 52/365 370/311 |
| 2016/0226637 A1* | 8/2016 | Nory | H04L 5/0053 |
| 2018/0192300 A1* | 7/2018 | Kazmi | H04L 5/005 |

OTHER PUBLICATIONS

International Search Report and Written Opinion—PCT/US2018/061299—ISA/EPO—dated Feb. 14, 2019.

Qualcomm Incorporated: "UE Adaptation to the Traffic and UE Power Consumption Characteristics," 3GPP Draft; R1-1813447 UE Adaptation for Power Saving, 3rd Generation Partnership Project (3GPP), Mobile Competence Centre; 650, Route Des Lucioles; F-06921 Sophia-Antipolis Cedex; France, vol. RAN WG1, No. Spokane, Washington, USA; Nov. 12, 2018-Nov. 16, 2018, Nov. 3, 2018, XP051479769, 20 pages, Retrieved from the Internet: URL: http://www.3gpp.org/ftp/tsg%5Fran/WG1%5FRL1/.

Qualcomm Incorporated: "Views on UE Power Saving," 3GPP Draft; R1-1809462 Views on UE Power Saving, 3GPP Draft; R1-1809462 Views on UE Power Saving, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 20, 2018-Aug. 24, 2018, Aug. 17, 2018, XP051516827, 12 pages, Retrieved from the Internet: URL: http://www.3gpp.org/ftp/tsg%5Fran/WG1%5FRL1/TSGR1%5F94/Docs/.

* cited by examiner

1000 

1002
RECEIVE, A REQUEST FOR REPORTING AN APERIODIC-CHANNEL QUALITY INDICATOR (A-CQI) RELATING TO A SECONDARY CELL (SCELL) CONFIGURED FOR THE UE WHEN THE UE IS IN A FIRST STATE CORRESPONDING TO THE SCELL, THE FIRST STATE DESIGNED FOR A REDUCED SCELL ACTIVATION LATENCY AND TO RESULT IN THE UE USING LOWER POWER AS COMPARED TO WHEN THE UE IS IN A SECOND STATE

1004
REPORT, IN RESPONSE TO THE REQUEST, THE A-CQI FOR THE SCELL IN ACCORDANCE WITH A FIRST A-CQI REPORTING CONFIGURATION FOR THE FIRST STATE WHICH IS DIFFERENT FROM A SECOND A-CQI REPORTING CONFIGURATION FOR THE SECOND STATE

1102

TRANSMIT, TO A USER EQUIPMENT (UE), A REQUEST FOR REPORTING AN APERIODIC-CHANNEL QUALITY INDICATOR (A-CQI) RELATING TO A SECONDARY CELL (SCELL) CONFIGURED FOR THE UE WHEN THE UE IS IN A FIRST STATE CORRESPONDING TO THE SCELL, THE FIRST STATE DESIGNED FOR A REDUCED SCELL ACTIVATION LATENCY AND TO RESULT IN THE UE USING LOWER POWER AS COMPARED TO WHEN THE UE IS IN A SECOND STATE

1104

RECEIVE, IN RESPONSE TO THE REQUEST, THE A-CQI FOR THE SCELL IN ACCORDANCE WITH A FIRST A-CQI REPORTING CONFIGURATION FOR THE FIRST STATE WHICH IS DIFFERENT FROM A SECOND A-CQI REPORTING CONFIGURATION FOR THE SECOND STATE

FIG. 11

METHODS AND APPARATUS FOR REPORTING APERIODIC CQI IN A NEW SCELL STATE OF LTE CARRIER AGGREGATION

This application claims priority to U.S. Provisional Application No. 62/588,119, entitled "METHODS AND APPARATUS FOR REPORTING APERIODIC CQI IN A NEW SCELL STATE OF LTE CARRIER AGGREGATION", filed on Nov. 17, 2017, which is expressly incorporated by reference in its entirety.

FIELD

The present disclosure relates generally to wireless communication, and more particularly, to methods and apparatus for reporting aperiodic channel quality indicator (A-CQI) in a new Secondary Cell (SCell) state of Long Term Evolution (LTE) carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a User Equipment (UE). The method generally includes receiving, a request for reporting an Aperiodic-Channel Quality Indicator (A-CQI) relating to a Secondary Cell (Scell) configured for the UE when the UE is in a first state corresponding to the Scell, the first state designed for a reduced SCell activation latency and to result in the UE using lower power as compared to when the UE is in a second state; and reporting, in response to the request, the A-CQI for the Scell in accordance with a first A-CQI reporting configuration for the first state which is different from a second A-CQI reporting configuration for the second state.

Certain aspects of the present disclosure provide a method for wireless communications by a User Equipment (UE). The method generally includes receiving, a request for reporting an Aperiodic-Sounding Reference Signal (A-SRS) relating to a Secondary Cell (Scell) configured for the UE when the UE is in a first state corresponding to the Scell, the first state designed for a reduced SCell activation latency and to result in the UE using lower power as compared to when the UE is in a second state; and reporting, in response to the request, the A-SRS for the Scell in accordance with a first A-SRS reporting configuration for the first state which is different from a second A-SRS reporting configuration for the second state.

Certain aspects of the present disclosure provide a method for wireless communications by a Base Station (BS). The method generally includes transmitting, to a User Equipment (UE), a request for reporting an Aperiodic-Channel Quality Indicator (A-CQI) relating to a Secondary Cell (Scell) configured for the UE when the UE is in a first state corresponding to the Scell, the first state designed for a reduced SCell activation latency and to result in the UE using lower power as compared to when the UE is in a second state; and receiving, in response to the request, the A-CQI for the Scell in accordance with a first A-CQI reporting configuration for the first state which is different from a second A-CQI reporting configuration for the second state.

Certain aspects of the present disclosure provide a method for wireless communications by a Base Station (BS). The method generally includes transmitting, to a User Equipment (UE), a request for reporting an Aperiodic-Sounding Reference Signal (A-SRS) relating to a Secondary Cell (Scell) configured for the UE when the UE is in a first state corresponding to the Scell, the first state designed for a reduced SCell activation latency and to result in the UE using lower power as compared to when the UE is in a second state, and receiving, in response to the request, the A-SRS for the Scell in accordance with a first A-SRS reporting configuration for the first state which is different from a second A-SRS reporting configuration for the second state.

Aspects generally include methods, apparatus, systems, computer program products, computer-readable medium, and processing systems, as substantially described herein with reference to and as illustrated by the accompanying drawings. "LTE" refers generally to LTE, LTE-Advanced (LTE-A), LTE in an unlicensed spectrum (LTE-whitespace), etc.

BRIEF DESCRIPTION OF THE DRAWINGS

FIG. 10 illustrates example operations 1000 that may be performed by a UE for reporting A-CQI while in the SCell new state, in accordance with certain aspects of the present disclosure.

FIG. 11 illustrates example operations 1100 that may be performed by a Base Station (e.g., eNB or gNB) for configuring, scheduling and receiving A-CQI, in accordance with certain aspects of the present disclosure.

DETAILED DESCRIPTION

Figure 1:
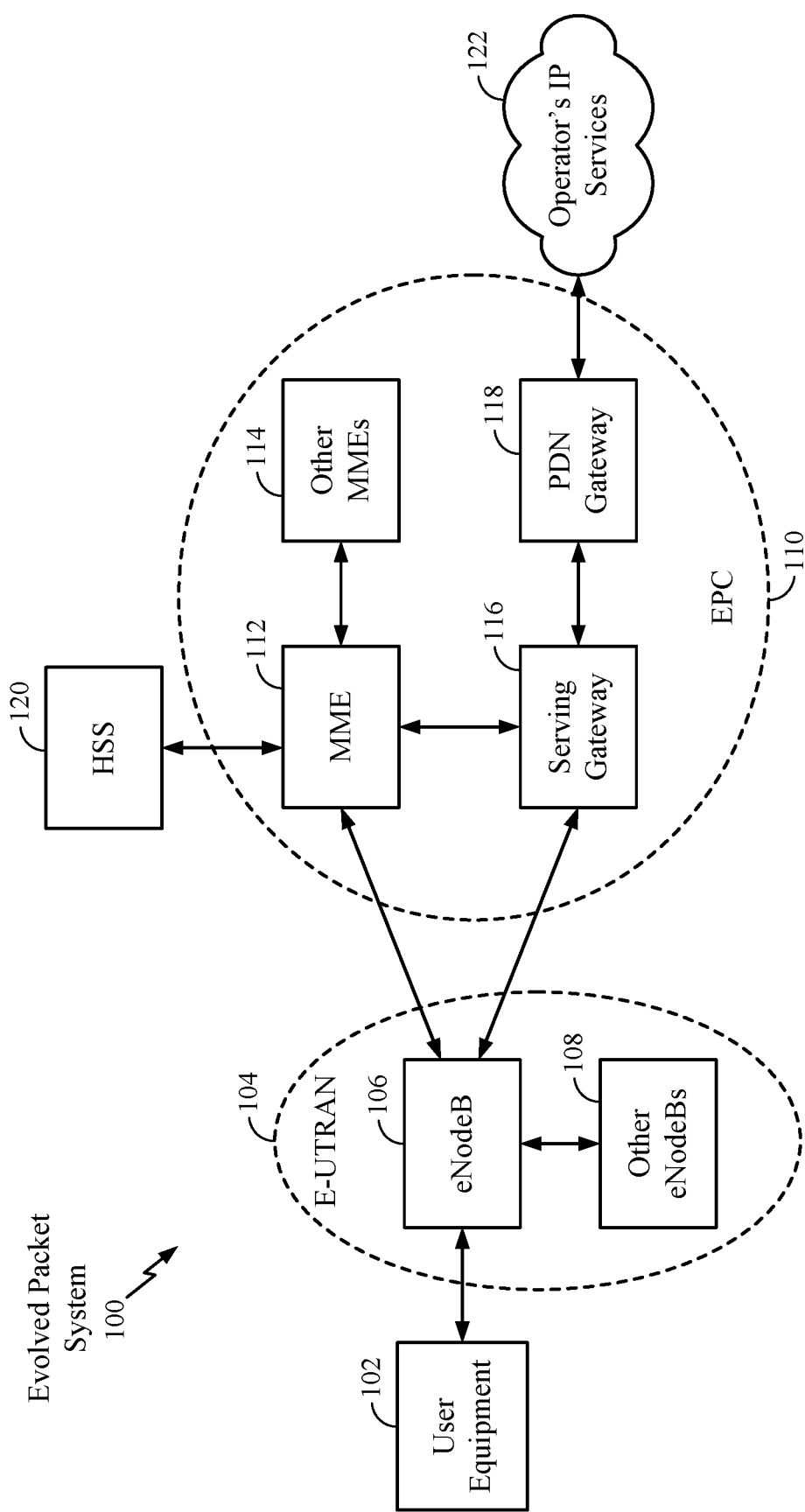
FIG. 1 is a diagram illustrating an example of a network architecture.

Carrier aggregation permits the use of more than one carrier in order to increase overall transmission bandwidth. To perform carrier aggregation, a UE may, in coordination with a network entity (e.g., eNB), initially select to a primary cell (PCell) and then have allocated one or more secondary cells (SCell) after evaluation by the network that such cells can also serve the UE.

In certain aspects, when a SCell is activated through a media access control (MAC) control element (CE), the UE may monitor an SCell physical downlink control channel (PDCCH) every one ms transmit time interval (TTI) or a short TTI. When the UE enters into a connected mode DRX (CDRX) state, UE may still monitor SCell PDCCH during a CDRX ON or activated period, resulting in significant SCell power consumption if the SCell is not deactivated based on SCell usage. Further, when there is no data to be scheduled on one or more SCells, the SCells may be deactivated through a MAC-CE deactivation procedure. However, SCell MAC-CE based activation and deactivation may cause longer delay. For example, SCell MAC-CE activation may not be sufficiently efficient so as to quickly activate SCells (e.g., through MAC-CE procedure) to off-load bursty traffic quickly and efficiently to licensed or unlicensed SCells. In an aspect, according to Release 10 LTE Carrier Aggregation, MAC-CE based activation of SCells from a deactivated state takes 24 ms/34 ms.

In certain aspects, in order to improve effective utilization of SCells (e.g., to enable quick scheduling on a SCell for quick bursty data offload), to reduce UE power consumption and speed up UE transition to SCell activated state, a low power SCell new state design has been proposed. As part of SCell new state design, the UE does not monitor PDCCH and reports low periodicity CSI in the new state based on network provided CSI configuration. In an aspect, the UE also does not receive or transmit data (e.g., no PDCCH monitoring or PUSCH transmissions) in the low power SCell new state. In an aspect, the SCell new state may also be referred to as a dormant state or a semi-dormant state.

In certain aspects, the LTE standards define configurations for reporting Aperiodic CQI/CSI (A-CQI or A-CSI) for both FDD and LTE operation. For example, when a UE receives a request/trigger (e.g., via uplink DCI) in subframe n to report A-CQI with respect to an SCell, the UE is required to report the A-CQI in subframe n+k. The standards define the values k may take for FDD and LTE.

In certain aspects, as part of new state design, UE performs periodic CSI measurements for periodic CQI reporting and then UE SCell goes into sleep state when it is not required to do any CQI measurements and reporting to conserve SCell power. Since UE does not monitor Cell Reference Signals (CRS) in new state in every TTI, UE does not continuously measure CSI and maintain filtered CSI at all times. To support SCell new state Aperiodic-CQI reporting, based on A-CSI/CQI trigger received by PDCCH DCI 0/4 (e.g., PDCCH DCI 0/4) or RACH Response Grant (PDCCH can be received on either PCell or other SCells), UE has to measure CSI on CQI reference resource and report A-CQI within the time specified by the standards. For example, the UE must report A-CQI within 4 ms of decoding the uplink DCI or Random Access Grant for FDD LTE. However, the UE may be in a sleep in the new state when it receives the request/trigger CQI reporting and it may not be possible for UE to measure CQI reference resource and report A-CSI in k=4 ms period for FDD LTE. In an aspect, it takes the UE at least 6 ms to wakeup from a sleep state and measure CSI for reporting. A similar problem exists for A-CQI reporting in the TDD mode depending on the value of k (e.g., as given by table 8.2).

Certain aspects of the present disclosure discuss techniques for modifying the A-CQI reporting timeline for reporting A-CQI in the SCell new state/mode. In certain aspects, the modified A-CQI reporting timeline is more relaxed as compared to the legacy timeline and provides a UE in the SCell new state more time to report A-CQI after receiving an A-CQI request/trigger. For example, the modified A-CQI provides enough time for the UE to wake up from a sleep state, measure CQI and report the CQI.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100 in which aspects of the present disclosure may be practiced.

In an aspect, a UE (e.g., UE 102) receives, a request for reporting an Aperiodic-Channel Quality Indicator (A-CQI) relating to a Secondary Cell (Scell) configured for the UE when the UE is in a first state corresponding to the Scell, the first state designed for a reduced SCell activation latency and to result in the UE using lower power as compared to when the UE is in a second state. The UE reports, in response to the request, the A-CQI for the Scell in accordance with a first A-CQI reporting configuration for the first state which is different from a second A-CQI reporting configuration for the second state. A base station (e.g., eNB 106 or 108) may perform the corresponding operations from the base station perspective as described in this disclosure.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMES 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
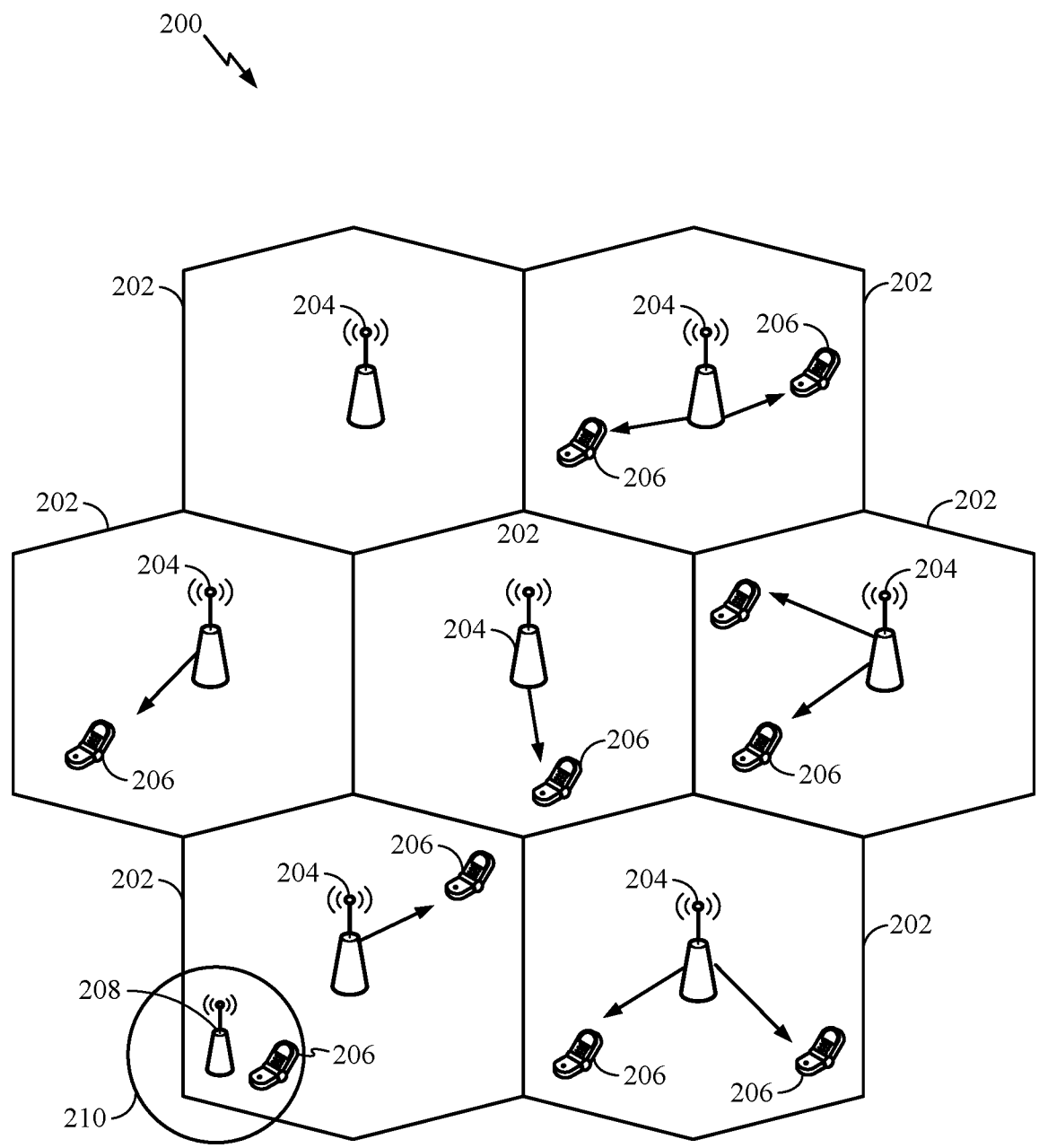
FIG. 2 is a diagram illustrating an example of an access network.

FIG. 2 is a diagram illustrating an example of an access network 200 in an LTE network architecture in which aspects of the present disclosure may be practiced. For example, UEs 206 and eNBs 204 may be configured to implement techniques for reporting A-CQI in a Scell new state as described in aspects of the present disclosure.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
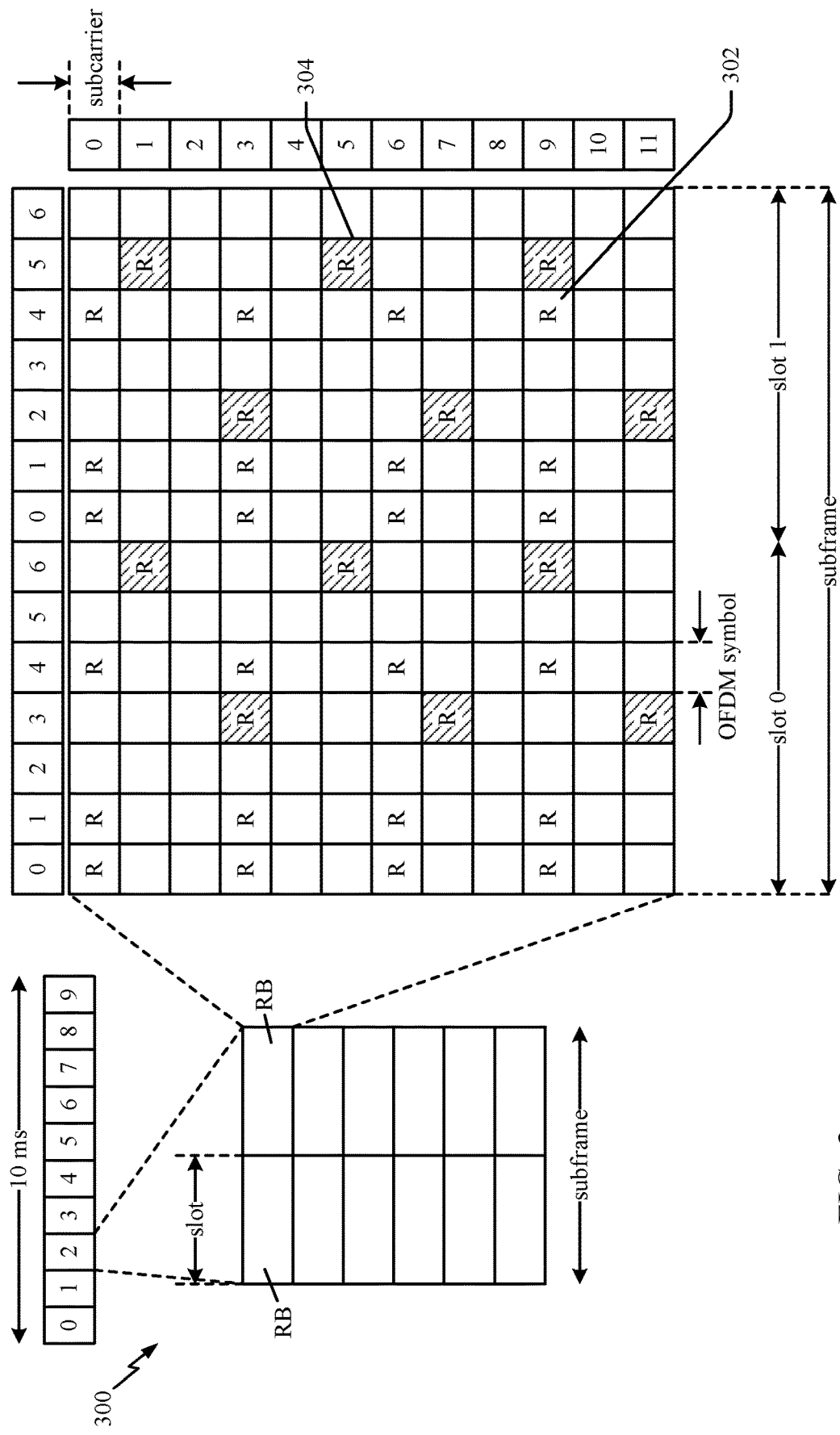
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
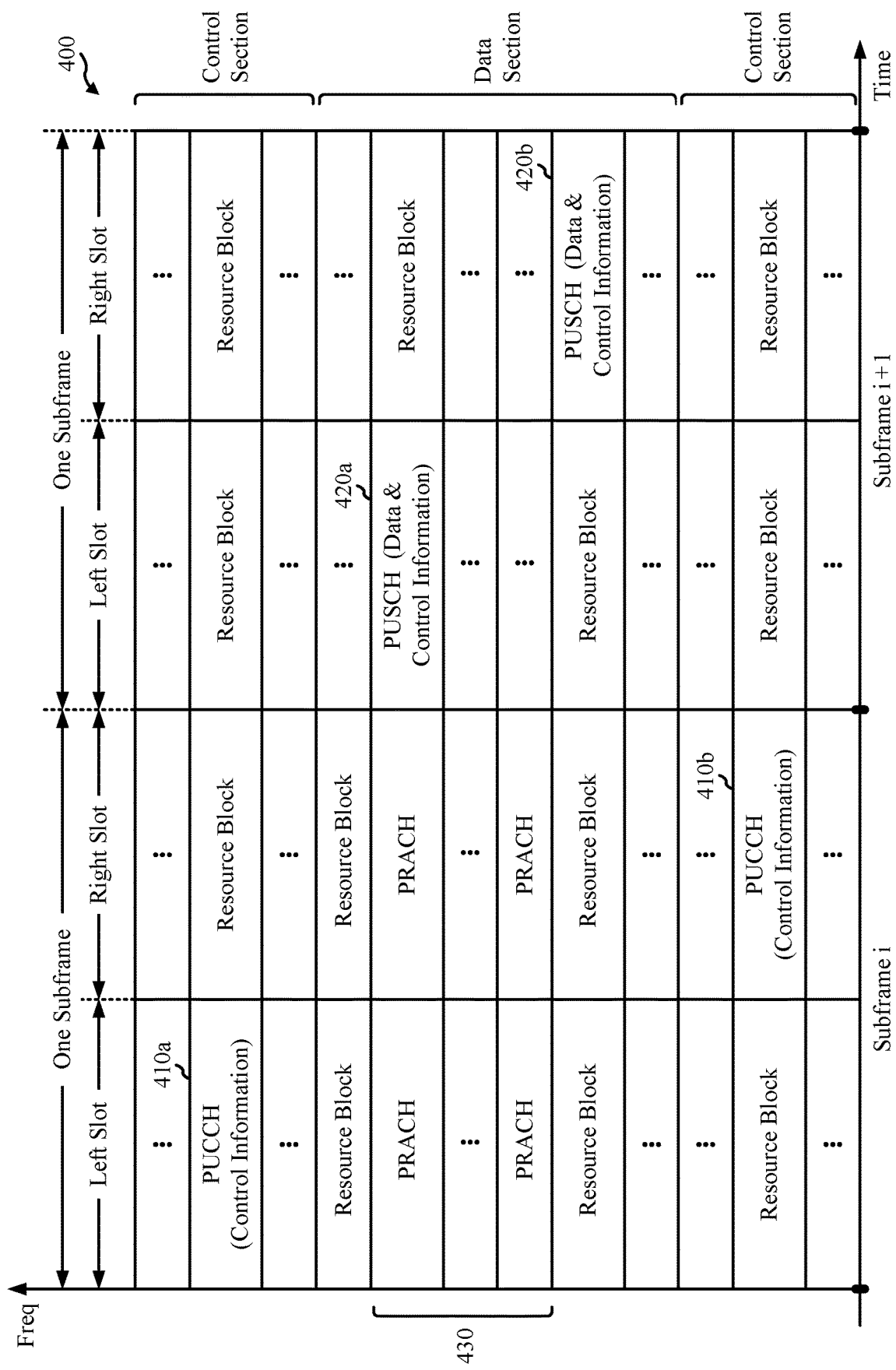
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
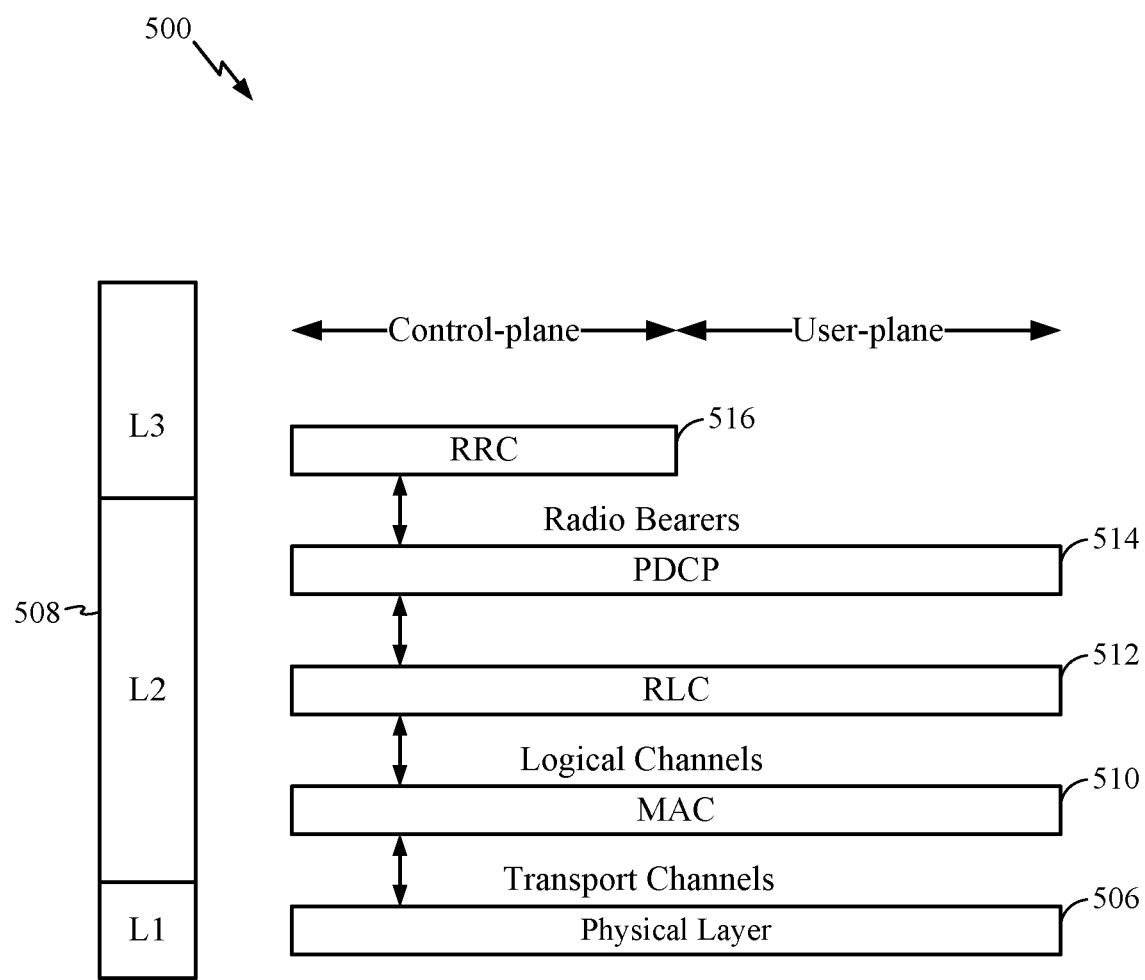
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
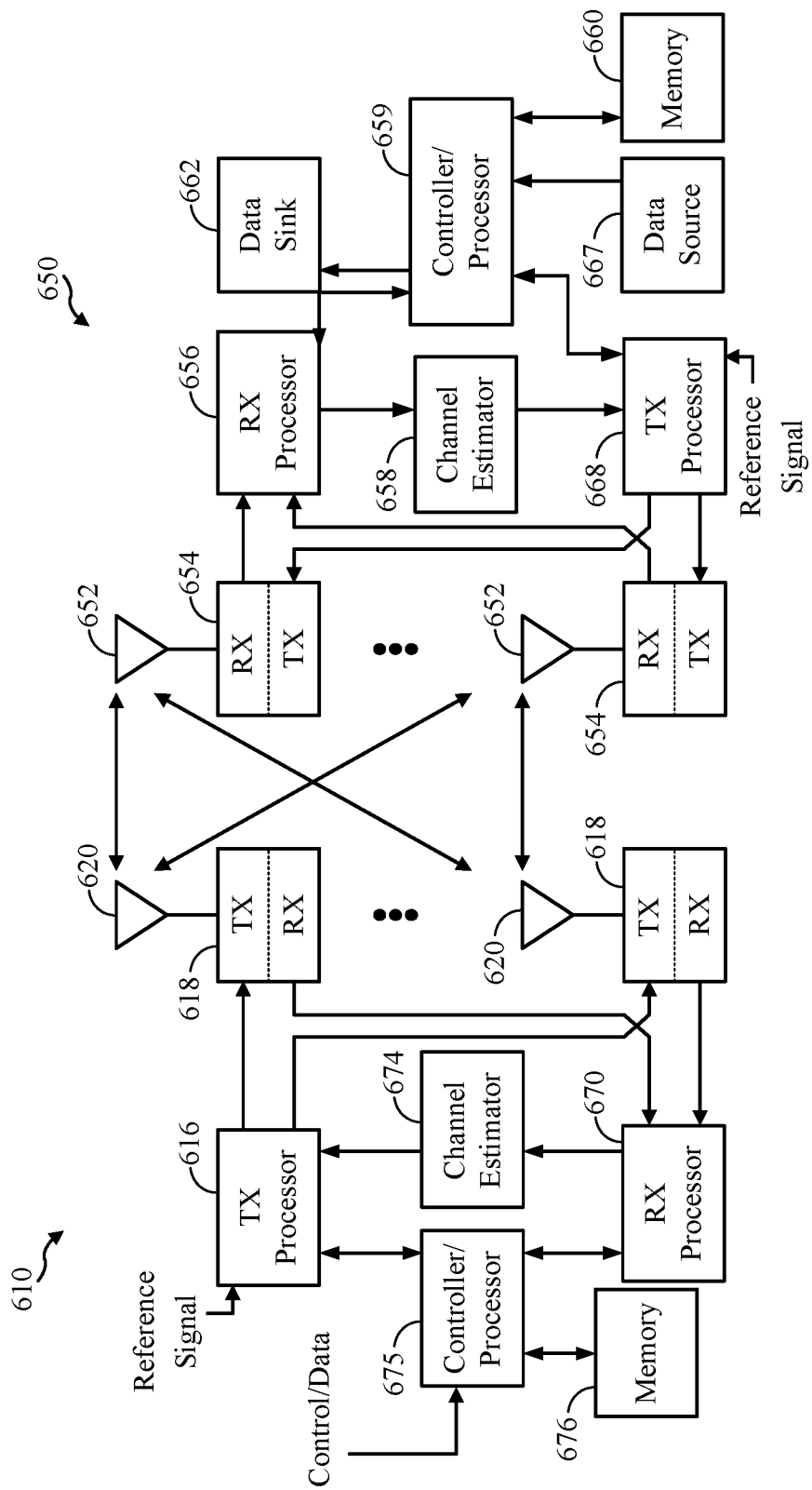
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be practiced.

In an aspect, a UE (e.g., UE 650) receives, a request for reporting an Aperiodic-Channel Quality Indicator (A-CQI) relating to a Secondary Cell (Scell) configured for the UE when the UE is in a first state corresponding to the Scell, the first state designed for a reduced SCell activation latency and to result in the UE using lower power as compared to when the UE is in a second state. The UE reports, in response to the request, the A-CQI for the Scell in accordance with a first A-CQI reporting configuration for the first state which is different from a second A-CQI reporting configuration for the second state.

In an aspect, an eNB (e.g., eNB 610) transmits, to a User Equipment (UE), a request for reporting an Aperiodic-Channel Quality Indicator (A-CQI) relating to a Secondary Cell (Scell) configured for the UE when the UE is in a first state corresponding to the Scell, the first state designed for a reduced SCell activation latency and to result in the UE using lower power as compared to when the UE is in a second state. The eNB receives, in response to the request, the A-CQI for the Scell in accordance with a first A-CQI reporting configuration for the first state which is different from a second A-CQI reporting configuration for the second state.

It may be noted that the UE noted above for implementing the improving inter-Radio Access Technology (RAT) measurements in accordance with certain aspects of the present disclosure may be implemented by a combination of one or more of the controller 659, the RX processor 656 and/or receiver 654 at the UE 650, for example.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

The controller/processor 659 and/or other processors, components and/or modules at the UE 650 may perform or direct operations, for example, operations 1000 in FIG. 10, and/or other processes for the techniques described herein for reporting A-CQI. Similarly the controller/processor 675 and/or other processors, components and/or modules at the eNB 610 may perform or direct operations, for example, operations 1100 in FIG. 11, and/or other processes for the techniques described herein for reporting A-CQI. In certain aspects, one or more of any of the components shown in FIG. 6 may be employed to perform example operations 1000 and 1100 and/or other processes for the techniques described herein. The memories 660 and 676 may store data and program codes for the UE 650 and eNB 610 respectively, accessible and executable by one or more other components of the UE 650 and the eNB 610.

Example Techniques Reporting A-CQI in a Scell New State of LTE Carrier Aggregation Carrier aggregation permits the use of more than one carrier in order to increase overall transmission bandwidth. To perform carrier aggregation, a UE may, in coordination with a network entity (e.g., eNB), initially select to a primary cell (PCell) and then have allocated one or more secondary cells (SCell) after evaluation by the network that such cells can also serve the UE.

Figure 7:
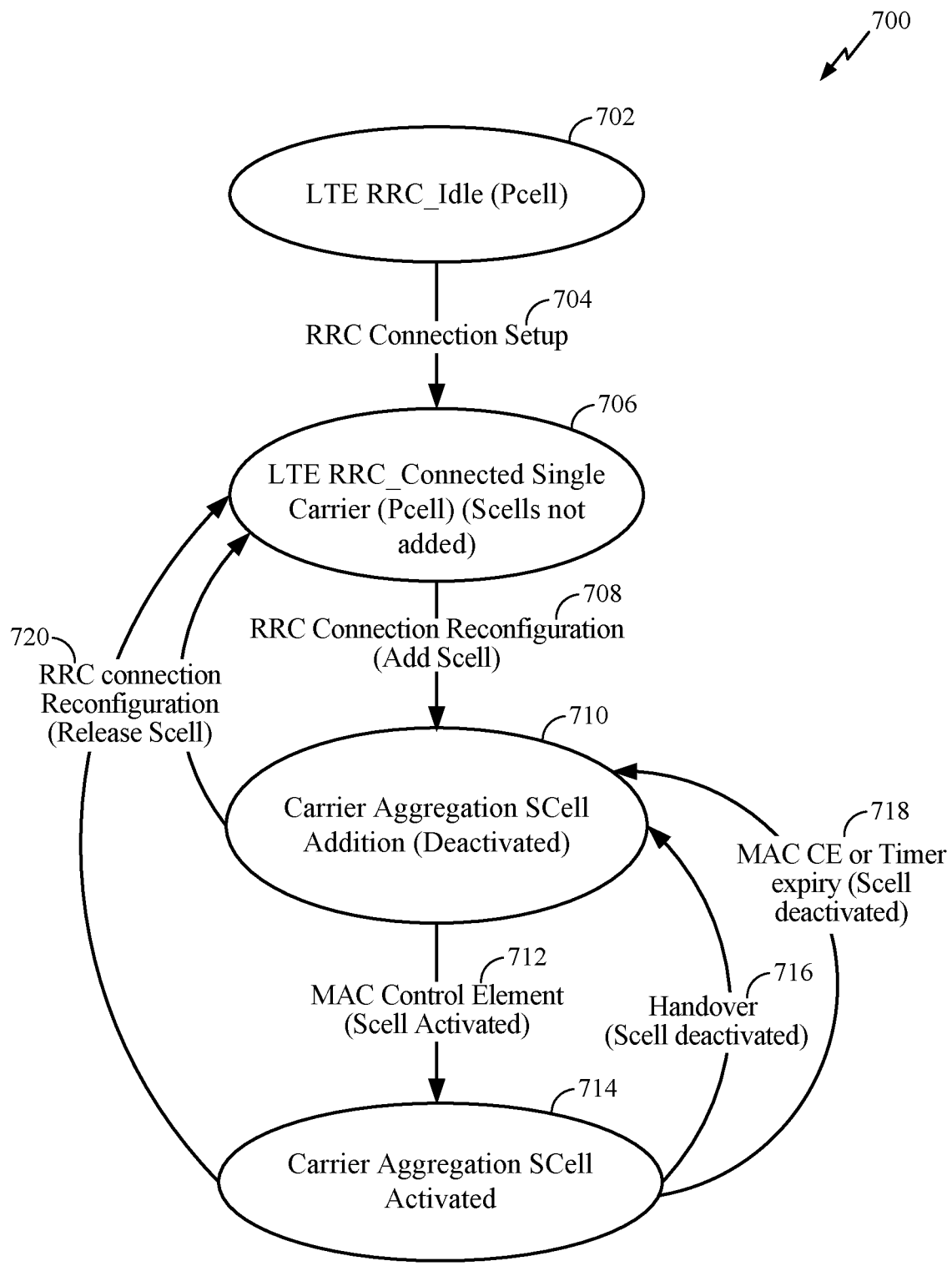
FIG. 7 illustrates a state diagram of an example carrier aggregation scheme 700. In some aspects, LTE Advanced carrier aggregation may support five carrier aggregations (e.g., one PCell and up to four SCells).

FIG. 7 illustrates a state diagram of an example carrier aggregation scheme 700. In some aspects, LTE Advanced carrier aggregation may support five carrier aggregations (e.g., one PCell and up to four SCells). Further, dual connectivity may allow carrier aggregation between two eNBs. In further implementations, 32 carrier aggregation may be supported (e.g., one PCell and up to 31 SCells).

In the carrier aggregation scheme 700, at 702, the UE may enter LTE Radio Resource Control (RRC) idle state with respect to a PCell. At 704, an RRC connection setup may be initiated between the UE and the network. At 706, the UE may transition to an LTE RRC connected state with a single carrier PCell (e.g., no SCells may be added at this point however). In some aspects, the UE may indicate carrier aggregation capabilities via an RRC UE capability information indication. In some aspects, the carrier aggregation capabilities may include capabilities indicating support for new states and/or transitions. At 708, the eNB uses an RRC connection reconfiguration message for SCell configuration (e.g., with or without SCell measurements from the UE, as eNB implementation choice). At 710, upon SCell configuration, SCell may remain in a deactivated state (e.g., by default). At 712, the eNB may use Medium Access Control (MAC) control element commands for SCell activation. At 714, when SCell is activated, the UE monitors SCell PDCCH during CDRX on state (e.g., CDRX may be common for both PCell and SCells). At 716, as a result of handover, the SCell may be deactivated and the carrier aggregation scheme 700 may return to 710. Similarly, at 718, the carrier aggregation scheme 700 may return to 710 when a MAC control element is received or a deactivation timer expires. At 720, an RRC connection reconfiguration may release an SCell such that the carrier aggregation scheme 700 returns to 706.

In certain aspects, when a SCell is activated through a media access control (MAC) control element (CE), the UE may monitor an SCell physical downlink control channel (PDCCH) every one milli second transmit time interval (TTI) or a short TTI. When the UE enters into a connected mode DRX (CDRX) state, UE may still monitor SCell PDCCH during a CDRX ON or activated period, resulting in significant SCell power consumption if the SCell is not deactivated based on SCell usage. Further, when there is no data to be scheduled on one or more SCells, the SCells may be deactivated through a MAC-CE deactivation procedure. However, SCell MAC-CE based activation and deactivation may cause longer delay. For example, SCell MAC-CE activation may not be sufficiently efficient so as to quickly activate SCells (e.g., through MAC-CE procedure) to offload bursty traffic quickly and efficiently to licensed or unlicensed SCells. In an aspect, according to Release 10 LTE Carrier Aggregation, MAC-CE based activation of SCells from a deactivated state takes 24 ms/34 ms.

Figure 8:
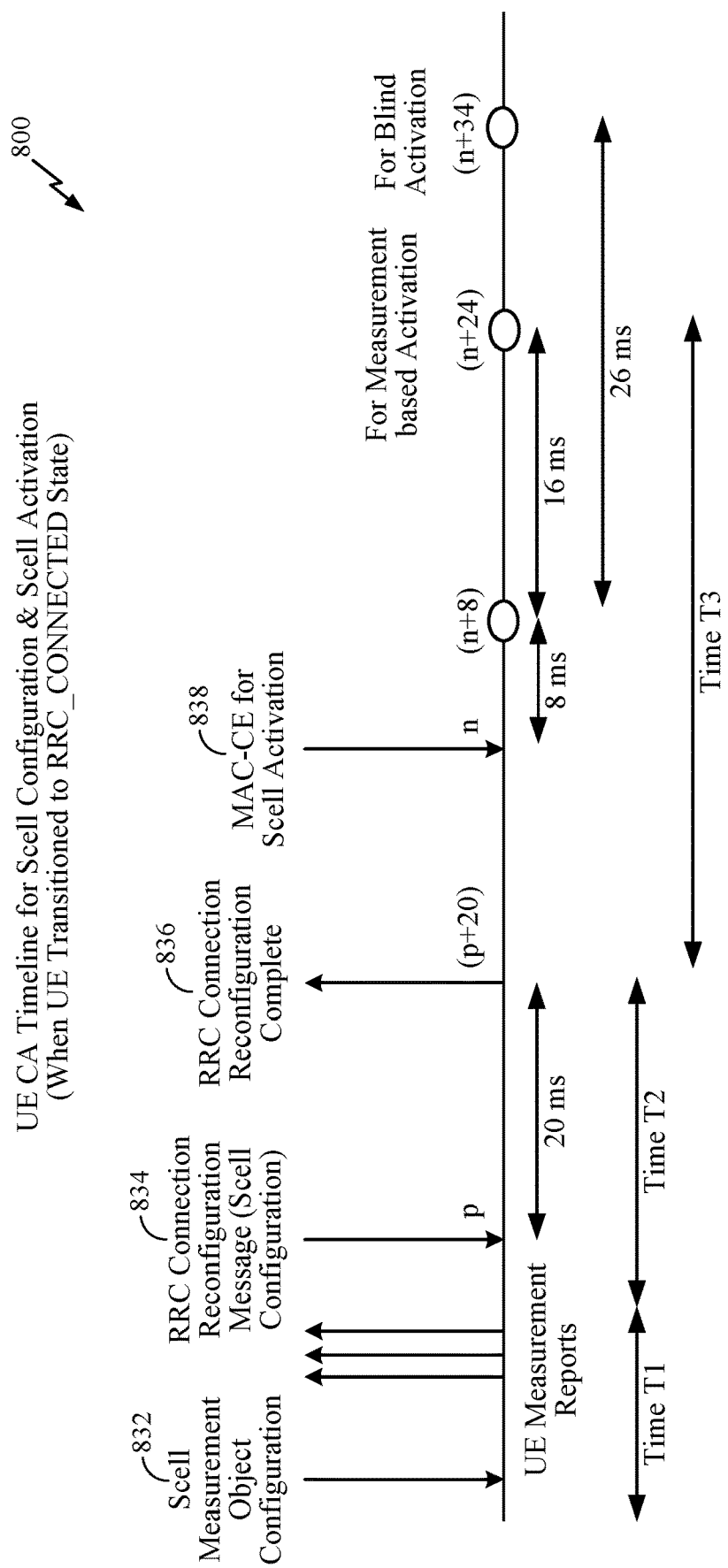
FIG. 8 illustrates a carrier aggregation secondary cell MAC control element activation timeline 800.

FIG. 8 illustrates a carrier aggregation secondary cell MAC control element activation timeline 800. At 832, an SCell measurement object configuration may be performed and the UE may subsequently report measurements according to the configuration. At 834, an RRC connection reconfiguration message may (SCell configuration) may be conducted. At 836, the RRC connection reconfiguration may be completed configuring one or more SCells for the UE. At 838, the MAC control element for SCell activation may be transmitted by the eNB and/or received by the UE. For example, when a downlink SCell activation (e.g., via MAC control element) is received in subframe (SF) "n", the UE may be able to complete a number of SCell actions by SF n+24 (e.g. for measurement based activation when previous measurements are available) or n+34 (e.g., for blind activation), but not before n+8, such as, but not limited to CSI (CQI/PMI/RI) reports, PDCCH monitoring on SCell, UL SRS transmissions, and/or PDSCH Reception/PUSCH transmissions.

While the UE is in a RRC connected state, after SCell is configured and activated, a common CDRX mechanism may be applicable for both PCell and Active SCells. During CDRX mode, and/or during CDRX ON period, the UE may monitor PDCCH for both PCell and one or more active SCells. Further, when the downlink SCell deactivation (e.g., via MAC control element) is received in SF 'n', the UE may stop a number of SCell actions no later than n+8, such as, but not limited to stop the SCell normal SCell operation including, uplink SRS transmissions, CSI (CQI/PMI/RI) reporting, PDCCH monitoring on/for the SCell, and/or PDSCH reception/PUSCH transmission, or stop the SCell deactivation timer.

One way to improve effective utilization of SCells (i.e., to enable quick scheduling on a SCell for quick bursty data offload) may be to maintain the SCell in an activated state while SCell is configured. In SCell active state, UE may perform PDCCH monitoring, active PDSCH/PUSCH data transfer, and is allowed to send channel state information (CSI) such as channel quality information (CQI) and/or sounding reference signal (SRS) based on eNB configuration. In some aspects, a state, sub-state, and/or mode may be the same and these terms may be used interchangeably throughout this disclosure. However, while this may allow effective SCell offload quickly, significant power consumption may be incurred by UE due to the SCell PDCCH monitoring procedure. Thus, it may be desirable to conserve UE power consumption for SCells in an activated SCell State and also enable quick offloading of data to activated SCells.

In certain aspects, in order to improve effective utilization of SCells (e.g., to enable quick scheduling on a SCell for quick bursty data offload), to reduce UE power consumption and speed up UE transition to SCell activated state, a low power SCell new state design has been proposed. As part of SCell new state design, the UE does not monitor PDCCH and reports low periodicity CSI in the new state based on network provided CSI configuration. In an aspect, the UE also does not receive or transmit data (e.g., no PDCCH monitoring or PUSCH transmissions) in the low power SCell new state. In certain aspects, by not monitoring at least the PDCCH (e.g., and further by not transmitting/receiving data) in the SCell new state, the UE saves a significant amount of power. However, since the UE still measures and reports CQI during the new state, the UE may quickly switch from the new state to a legacy SCell activated state. For example, the activation delay may be reduced from 24 ms to 6 ms, which is a significant decrease in activation delay.

Figure 9:
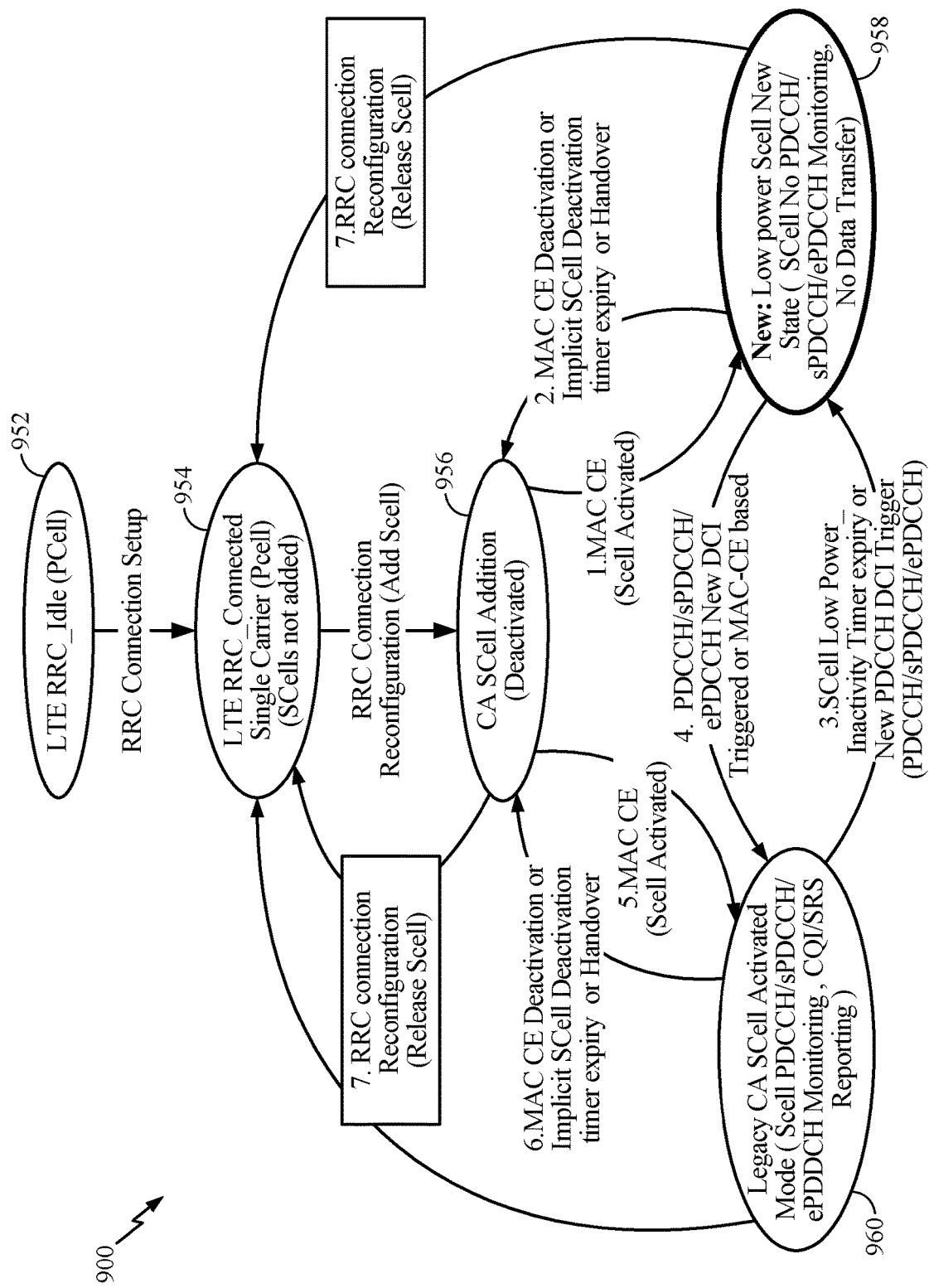
FIG. 9 illustrates a state diagram of an example carrier aggregation scheme 900 employing a low power secondary cell active mode or state.

FIG. 9 illustrates a state diagram of an example carrier aggregation scheme 900 employing a low power secondary cell active mode or state. In the carrier aggregation scheme 900, at 952, the UE may enter LTE RRC idle state with respect to a PCell. An RRC connection setup may be initiated between the UE and the network. At 954, the UE may transition to an LTE RRC connected state with a single carrier PCell (e.g., no SCells may be added at this point however). In some aspects, the UE may indicate capabilities to support new states and/or transitions via an RRC UE capability information indication. The eNB uses an RRC reconfiguration message for SCell configuration (e.g., with or without SCell measurements from the UE, as eNB implementation choice). At 956, upon SCell configuration, SCell may remain in a deactivated state (e.g., by default).

At 958, the UE may transition from the SCell deactivated to the low power SCell mode based on a MAC control element. In an aspect, the UE may transition to the low power Scell mode with respect to one or more SCells while other SCells configured for the UE may remain in the deactivated state or transition to the legacy SCell activated state. In one instance, the UE may be allowed to enter the low power SCell mode based on the MAC control element. Alternatively, the UE may be allowed to enter the low power SCell mode or a legacy transition to a legacy CA SCell activated mode at 960 at a time. The forgoing may be disambiguated according to a number of schemes.

In some aspects, the UE may transition from the low power SCell mode at 958 to an SCell deactivated state at 956 via a MAC control element deactivation method or implicitly via an SCell deactivation timer expiration for a given SCell or due to handover. The deactivation timer may be a default timer or a different timer that can be defined so that the value can be larger than the legacy values.

The UE may transition from the SCell activated state having PDCCH monitoring at 960 to the low power SCell mode not having PDCCH monitoring by UE at 958 via a low power inactivity timer expiration (e.g., Low Power Inactivity Timer Expiry) specific to or associated with an SCell or a PDCCH downlink control information (DCI) trigger received on at least one PCell or SCell. For example, the low power inactivity timer may be a function of a CDRX inactivity timer or a distinct defined timer. The transition from 960 to 958 may be prioritized by defining a shorter low power inactivity timer compared to legacy SCell inactivity timer, in which case a transition may be made to 956 due to the SCell inactivity timer expiry not occurring.

The UE may transition from the low power SCell mode at 958 to the SCell PDCCH active monitoring state at 960 via a PDCCH DCI trigger received on at least one PCell or other SCell(s) (e.g., other Scell(s) in activated state) or based on MAC-CE. In an aspect, the PDCCH DCI trigger received on a PCell or other SCell(s) may have a reduced latency to activate the SCell in the low power Scell mode as compared to a latency of a regular MAC control element activation procedure. The DCI may be used for transitioning SCell from the low power SCell mode to the PDCCH active monitoring state at 960 (e.g., different from the scheduling DCI, which can be legacy DCI), or also be used to transition and to schedule on SCells together. The PDCCH DCI can be transmitted either using a one ms TTI or a Short TTI.

Further, the PDCCH DCI can be used to indicate individual SCell identifiers or a group of SCells. The mapping between SCell activation bits to individual SCell identifiers or SCell identifier groups (e.g., each SCell group can be configured with multiple SCell identifiers) may be configured through RRC reconfiguration procedure during SCell configuration procedure, allowing a reduction in a number of SCell activation bits used, and also allowing a same band/inter band SCells with approximately similar coverage to be grouped together and activated effectively. The forgoing may also allow flexibility in activating only desired SCell identifiers rather than activating all SCells to PDCCH monitoring mode.

The UE may transition from the SCell deactivated state at 956 to the SCell activated state 960 (e.g., through a MAC control element). In an aspect, a UE may operate according to or otherwise be in one of the states at 958 or 960 at a time, as described above.

The UE may transition from SCell active PDCCH monitoring mode at 960 to an SCell deactivated at 956 through a MAC control element deactivation procedure or implicitly via an SCell deactivation timer expiry for a given SCell.

The transition from the SCell activated mode at 960 to the low power SCell mode at 958 may be prioritized by defining a shorter low power inactivity timer, in which case the transition from the SCell activated mode at 960 to SCell deactivated mode 956 due to the SCell inactivity timer expiry may not happen.

The UE may release the SCell and return to the single carrier PCell at 954, for example, when the UE receives an RRC connection reconfiguration message with SCell release during SCell active modes (e.g., low power SCell mode at 958 or PDCCH monitoring mode at 960). The UE may release the corresponding SCell(s) as indicated in the RRC connection reconfiguration message.

In some aspects, from a carrier aggregation UE State machine perspective, MAC control element activation and deactivation may be considered as an outer loop, and the transition between low power SCell mode at 958 and the PDCCH monitoring mode at 960 may be considered as an inner loop operation of an SCell.

In some aspects, based on the RRC connection reconfiguration procedure, during SCell configuration, SCells may be allowed to enter directly into low power SCell mode as soon as the SCell is configured, thereby bypassing the SCell deactivated state at 956 and use of a MAC control element to activate SCell by using the RRC information element specified per configured SCell basis or for all configured SCells. In some aspects, an example indication may include or otherwise correspond to a Boolean indication "AllowedDirectTransitionToLowPowerState=True or False".

In certain aspects, the LTE standards define configurations for reporting Aperiodic CQI/CSI (A-CQI or A-CSI) for both FDD and TDD operation. For example, when a UE receives a request/trigger (e.g., via uplink DCI) in subframe n to report A-CQI with respect to an SCell, the UE is required to report the A-CQI in subframe n+k. The standards define the values k may take for FDD and LTE. For example, 3GPP TS 36.213 V10.12.0, section 7.2.1 "Aperiodic CSI Reporting using PUSCH" discloses that "[a] UE shall perform aperiodic CSI reporting using the PUSCH in subframe n+k on serving cell c, upon decoding in subframe n either an uplink DCI format, or a Random Access Response Grant." In an aspect, a CSI request field in the DCI triggers a CSI report. According to this standard section, "[w]hen the CSI request field from an uplink DCI format is set to trigger a report, for FDD k=4, and for TDD UL/DL configuration 1-6, k is given in Table 8-2. For TDD UL/DL configuration 0, if the MSB of the UL index is set to 1 and LSB of the UL index is set to 0, k is given in Table 8-2; or if MSB of the UL index is set to 0 and LSB of the UL index is set to 1, k is equal to 7; or if both MSB and LSB of the UL index is set to 1, k is given in Table 8-2."

TABLE 8-2

(3GPP TS 36.213) k for TDD configurations 0-6

| TDD UL/DL Configuration | \multicolumn{10}{c}{subframe number n} | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 |   |   |   | 4 | 6 |   |   |   |
| 1 |   | 6 |   |   | 4 |   | 6 |   |   | 4 |
| 2 |   |   |   | 4 |   |   |   |   | 4 |   |
| 3 | 4 |   |   |   |   |   |   |   | 4 | 4 |
| 4 |   |   |   |   |   |   |   |   | 4 | 4 |
| 5 |   |   |   |   |   |   |   |   | 4 |   |
| 6 | 7 | 7 |   |   |   | 7 | 7 |   |   | 5 |

In certain aspects, as part of SCell new state design, UE performs periodic CSI measurements for periodic CQI reporting and then UE SCell goes into sleep state when it is not required to do any CQI measurements and reporting to conserve SCell power. Since UE does not monitor Cell Reference Signals (CRS) in the new state in every TTI, UE does not continuously measure CSI and maintain filtered CSI at all times. To support SCell new state A-CQI reporting, based on A-CSI/CQI trigger received by PDCCH DCI 0/4 (e.g., PDCCH DCI 0/4) or RACH Response Grant (PDCCH may be received on either PCell or other SCells), UE has to measure CSI on CQI reference resource and report A-CQI within the time specified by the standards. For example, the UE must report A-CQI within 4 ms of decoding the uplink DCI Grant for FDD LTE. However, the UE may be in a sleep state in the SCell new state when it receives the request/trigger CQI reporting and it may not be possible for the UE to measure CQI reference resource and report A-CSI in k=4 ms period for FDD LTE. In an aspect, it takes the UE at least 6 ms (UE implementation based delay) to wakeup from a sleep state and measure CSI for reporting. A similar problem exists for A-CQI reporting in the TDD mode depending on the value of k (e.g., as given by table 8.2 above).

Certain aspects of the present disclosure discuss techniques for modifying the A-CQI reporting timeline for reporting A-CQI in the SCell new state/mode. In certain aspects, the modified A-CQI reporting timeline is more relaxed as compared to the legacy timeline and provides a UE in the SCell new state more time to report A-CQI after receiving an A-CQI request/trigger. For example, the modified A-CQI provides enough time for the UE to wake up from a sleep state, measure CQI and report the CQI.

FIG. 10 illustrates example operations 1000 that may be performed by a UE for reporting A-CQI while in the SCell new state, in accordance with certain aspects of the present disclosure.

Operations 1000 begin, at 1002, by receiving a request for reporting an A-CQI relating to a SCell configured for the UE when the UE is in a first state corresponding to the SCell, the first state designed for a reduced SCell activation latency and to result in the UE using lower power as compared to when the UE is in a second state.

At 1004, the UE reports, in response to the request, the A-CQI for the SCell in accordance with a first A-CQI reporting configuration for the first state which is different from a second A-CQI report configuration for the second state.

FIG. 11 illustrates example operations 1100 that may be performed by a Base Station (e.g., eNB or gNB) for configuring, scheduling and receiving A-CQI, in accordance with certain aspects of the present disclosure.

Operations 1100 begin, at 1102, by transmitting, to a UE a request for reporting an A-CQI relating to a SCell configured for the UE when the UE is in a first state corresponding to the SCell, the first state designed for a reduced SCell activation latency and to result in the UE using lower power as compared to when the UE is in a second state.

At 1104, the base station transmits, in response to the request, the A-CQI for the SCell in accordance with a first A-CQI reporting configuration for the first state which is different from a second A-CQI report configuration for the second state.

In an aspect, the first state is the SCell new state discussed above and the second state is the legacy SCell active state also discussed above. In an aspect, the first A-CQI reporting configuration corresponds to the SCell new state and the second A-CQI reporting configuration corresponds to the legacy SCell active state. The first A-CQI reporting configuration configures a first A-CQI reporting timeline for the new SCell state that is more relaxed as compared to a second A-CQI reporting timeline configured by the second A-CQI reporting configuration for the legacy SCell active state. For example, the first A-CQI reporting timeline provides the UE more time than the second A-CQI reporting timeline to report the A-CQI after receiving the request. In an aspect, the time the UE has in accordance with the first A-CQI reporting timeline to report the A-CQI after receiving the request, at least includes a time taken by the UE to wakeup from a sleep state and measure CQI.

The following disclosure discusses various techniques for modifying the A-CQI reporting timeline for FDD LTE and TDD LTE modes. It may be noted that one or more techniques discussed with reference to either FDD or TDD may apply to both FDD and TDD modes.

A-CQI Reporting Configuration for the Scell New State—FDD LTE Case

In certain aspects, if a UE in the SCell new state with respect to a SCell, receives PDCCH DCI (e.g., PDCCH DCI 0/4) in subframe 'n' (with or without PUSCH grant information), the UE may transmit the A-CQI for the SCell new state in "n+k'" using PUSCH of PCell or SCell, where k'>4 (legacy A-CQI configuration). This provides the UE with more time to wake up from a sleep state, measure and report the CQI. For example, the UE takes 6 ms to wake up from a sleep state and measure CQI for reporting. Once awake, the UE may receive a PUSCH grant and takes another 4 ms to transmit based on the grant from the time it receives the grant. Thus, the UE takes a minimum of n+6 ms+4 ms, i.e., n+10 ms (e.g., k'=10 ms) to report A-CQI. This essentially means that the timeline for A-CSI is different for activated and new state cells.

An example UE implementation may be as follows. The UE receives the grant in subframe n, for example, in PCC or other SCell in active state. The UE measures in subframe n+m1 (e.g., m1=1). Thus, the CSI reference resource (e.g., CRS) is subframe N+m1. The UE feeds back A-CQI in subframe n+k'.

In certain aspects, if an UL PUSCH is already scheduled in subframe "n+k'", the same grant may be used by the UE for transmitting A-CSI multiplexed with other UL PUSCH data.

In certain aspects, if no PUSCH is scheduled for PUSCH data transmission in subframe n+k', then, if the UE is to follow the legacy timeline between the grant and UL, eNB may provide UL PUSCH grant in (n+k'−4) subframe. In an aspect, if UE fails to decode PDCCH DCI (e.g., PDCCH DCI 0/4) grant carrying A-CSI trigger in sub frame "n", UE is not expected to report any A-CSI in sub frame n+k'. In this case, the PUSCH grant that was provided by eNB in subframe (n+k'−4) for A-CSI transmission may be used to transmit padding bits if there is no UL data available for transmission. One drawback of this is that if the UE fails to detect the A-CSI trigger at subframe n and receives the PUSCH grant at subframe n+k'−4, the PUSCH grant may go waste.

In certain aspects, the eNB may schedule two PDCCH DCI triggers in subframe 'n'. One PDCCH DCI 0/4 (with C-RNTI) may be used for scheduling PUSCH transmission in SF #(n+4). A second New PDCCH DCI (with New RNTI) may be used to trigger A-CQI & PUSCH grant in subframe (n+k'). This means that the UE has to decode two PDCCH DCIs in sub frame "n" for UL Grant and A-CQI purpose. Further, the UE may not need to wake up at subframe #n+k'−4 to receive an UL grant. In an aspect, if the eNB also sends PDCCH DCI 0/4 (UL grant) in SF #(n+k'−4), there will be two PUSCH grants for SF #(n+k'). In this case, UE may use the latest PUSCH grant received in SF #(n+k'−4) to transmit A-CQI multiplexed with PUSCH data. In an aspect, the eNB scheduler may avoid scheduling PDCCH DCI 0/4 in subframe (n+k'−4). Thus, this solution avoids eNB triggering A-CSI in SF #n and providing actual PUSCH grant in SF #(n+k'−4) (i.e., in separate subframes) and thus helps with misdetection of A-CQI PDCCH trigger in SF #n, which as noted above results in wastage of A-CSI transmission grant provided in SF #(n+k'−4). In certain aspects, eNB may transmit the new PDCCH DCI with new RNTI only (e.g., without the PDCCH DCI 0/4 with C-RNTI) in subframe n if there is not PUSCH data to schedule at subframe #n+4.

In certain aspects, if periodic CSI is configured and aperiodic CSI is also triggered, to meet the k=4 legacy timeline for A-CQI reporting, the UE may use previously measured periodic CQI for reporting A-CQI. One drawback of this technique is that if the periodicity of periodic CQI reports is low, the previously measured CQI used for A-CQI reporting may be old and may not accurately reflect the state of the channel.

In certain aspects, the eNB may transmit an indication to the UE that a request/trigger is to be transmitted in a subsequent time window. For example, the eNB may provide an A-CQI indication to the UE in advance using new PDCCH DCI (with new RNTI) or use legacy PDCCH DCI 0/4 with new bit indication. In an aspect, the A-CQI indication defines a time window of length "w" ms (example 12 or 14 ms window). This window of advance notification allows UE to prepare in advance with A-CQI measurements. For example, in response to the indication, the UE may measure CQI for reporting during the time window 'w'. Within window "w" ms if the eNB sends any Aperiodic PDCCH DCI 0/4 trigger in sf #n, the UE may transmit A-CSI in sf #(n+4) which is same legacy FDD LTE A-CSI transmission timeline. This solution requires UE to be awake during window "w" ms and avoids changing A-CSI reporting timeline for the SCELL new state.

A-CQI Reporting Configuration for the Scell New State—TDD LTE Case

In certain aspects, the A-CQI configuration for the SCell new state for the TDD mode provides revised k values referred to here as "k'" values. Table 1 shows the k' values which are revised k values defined in Table 8-2 of 3GPP TS 36.213. Thus, in accordance with the new A-CQI configuration for the SCell new state for the TDD mode, if the UE receives an A-CQI trigger/request in subframe n, the UE transmits the A-CQI in subframe n+k'. Example TDD LTE modified timeline with k' values is given below.

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 12 | 13 | | | | 12 | 13 | | | |
| 1 | | 12 | | | 13 | | 12 | | | 13 |
| 2 | | | | 14 | | | | | 14 | |
| 3 | 12 | | | | | | | | 14 | 13 |
| 4 | | | | | | | | | 14 | 13 |
| 5 | | | | | | | | | 14 | |
| 6 | 13 | 13 | | | | 13 | 16 | | | 13 |

In certain aspects, if UL PUSCH is scheduled in subframe (n+k'), the same grant may be used by the UE for transmitting A-CSI multiplexed with UL PUSCH.

In certain aspects, if no PUSCH is scheduled for PUSCH data transmission in (n+k') subframe, then, if the UE is to follow the legacy timeline between the grant and UL, eNB may provide UL PUSCH grant in the next available PDCCH UL grant to meet (n+k') A-CSI reporting timeline. In an aspect, if the UE fails to decode PDCCH DCI 0/4 grant carrying A-CSI trigger in sub frame "n", the UE is not expected to report A-CSI in sub frame (n+k'). In this case, whatever PUSCH grant provided by eNB in next available subframe for A-CSI transmission may be used to transmit padding bits if there is no UL data available for transmission.

In certain aspects, similar to the FDD case discussed above, for the TDD case, if Periodic CQI is configured and Aperiodic CQI is also triggered, to meet (n+k) legacy timeline as specified in TS 36.213 Table 8-2 for A-CQI reporting, UE may use previously measured Periodic CQI for reporting A-CQI.

As noted above, it takes the UE about 6 ms (UE implementation delay and can be variable) or subframes to wake up from the sleep state and measure CQI. In certain aspects, assuming that the UE receives the A-CSI trigger in subframe n, the UE may select the first UL subframe after/at n+6 to transmit the A-CSI.

In certain aspects, the UE needs to measure CQI in a "valid" subframe as defined by the standards. For example if CRS based CSI feedback is enabled, the measured subframes cannot be an MBSFN or a special subframe with short duration in TDD. In an aspect, subframes including CRS transmissions are valid subframes.

In certain aspects, the LTE standards (e.g., Release 10 eICIC) allow scheduling two different sets of subframes for CQI measurement. The UE may measure CQI for both sets of subframes and report two separate CQIs based on the two sets of subframes. However, in certain aspects, the configuration for the SCell new state allows only one subframe set configured for CQI measurements in the new Scell state. In an aspect, the network conveys the CQI configuration for the Scell new state (e.g., via RRC signaling) including the subframe set configured for the new state. Thus, if two subframe sets are configured for CSI feedback (e.g., for legacy active Scell state), the UE needs to use the correct subframe set configured for the Scell new state. In an aspect, in the new state, the subframe set CSI (if configured for the UE in the legacy active state) may be disabled and only subframe set 0 may be assumed.

In certain aspects, as part of CoMP certain CSI-RS resources may be muted/blanked in order to reduce interference to neighbor cells. In an aspect, for CSI-RS based CSI feedback, the presence (or absence) of Non Zero Power (NZP) CSI-RS (e.g., where the CSI-RS resources are muted and where CSI-RS is not muted) after subframe n (e.g., after A-CQI triggering DCI is received) may be dynamically indicated to the UE. Having this knowledge allows UE to determine which resources may be used for measuring CQI. For example, for CSI-RS based CSI, the UE may not be able to measure CSI at resources where CSI-RS is muted.

In certain aspects, for both FDD and TDD modes, a new DCI (e.g., PDCCH DCI UL grant) may be configured and transmitted to the UE for A-CQI scheduling for the new state only which does not provide any UL PUSCH grant but only indicates A-CQI trigger. This new DCI may be used when there is no PUSCH data to be scheduled in the same subframe that includes the new DCI. In an aspect, for FDD LTE, the PUSCH grant for reporting the A-CQI may be conveyed in subframe #(n+k'−4), where k' is as configured by A-CQI configuration for the new state in the FDD mode. In an aspect, for TDD LTE, the PUSCH grant for reporting the A-CQI may be conveyed in subframe #(n+k'−k), where k' is as configured by A-CQI configuration for the new state in the TDD mode and k is as configured for the legacy Scell active state. For example, k' is given by the Table 1 shown above and k is given by Table 8.2 of 3GPP TS 36.213 as shown above.

Collision with Other PUSCH/Scheduling Issues

In certain aspects, the grant (e.g., PDCCH DCI UL grant) triggering the A-CSI may also trigger a transport block (TB) transmission on PUSCH. This may lead to a collision between A-CSI and TB transmission. The UE may be configured to handle this situation in a number of ways. In one aspect, the A-CSI may be configured to follow n+k' timeline (e.g., k'=10 for FDD) and the TB may be configured to follow the legacy N+k timeline (e.g., k=4 in FDD). In a second aspect, for A-CSI triggering for a new state carrier, the DCI may be configured to only carry an A-CSI trigger (e.g., empty PUSCH grant). This may be a new DCI format or a legacy DCI format. In a third aspect, both TB and CSI may be configured to follow n+k' timeline. However, this option is unlikely and may include complications resulting from collisions.

In certain aspects, the network may transmit an A-CSI trigger indication in subframe n for the UE to report A-CSI in a subframe n+k' (e.g., n+10 for FDD). In addition, the network may also transmit another PUSCH grant that schedules PUSCH in the same subframe (subframe n+k') as the A-CSI is to be transmitted. For example, the network may transmit the PUSCH grant in subframe (n+6) for FDD which schedules PUSCH 4 subframes later in subframe n+10. The UE may be configured to handle this situation in a number of ways. In one aspect, the UE is not expected to handle this situation. For example, the UE may be configured to drop the PUSCH grant. In a second aspect, the UE transmits UCI (e.g., including A-CSI) over PUSCH multiplexed with the data as in the legacy case, taking into account that the grant for data and the A-CSI trigger arrived in different subframes. In a third aspect, the UE transmits the UCI (e.g., including A-CSI) over PUSCH, but the UCI punctures the PUSCH (e.g., instead of rate matching). This may allow for successful eNB decoding even if the UE misses on of the grants without the need to do blind decoding at the eNB.

Triggering for Multiple CSI

In certain aspects, A-CSI may be triggered for multiple cells, for example, a set of CCs (e.g., according to TS 36.213, Table 7.2.1-1A. a A-CSI trigger may be for a set of CCs), a subset of the set of CCs being in an active state and another subset of the CCs are in the new state. This situation may be handled in a number of ways. In one aspect, active cells are configured to follow the legacy n+k timeline and the new state cells are configured to follow the new state n+k' timeline discussed above. CSIs for both the active and new state cells may be transmitted in their corresponding subframes based on their corresponding timelines. In a second aspect, only cells of the same type are allowed in the same group. That is the UE is not triggered in the same subframe with feedback for active and new state cells at the same time. In a third aspect, the CSI trigger is changed in such a way that activated and new state cells are triggered separately. For example, the DCI may indicate whether the feedback is for an active or a new state cell. In one implementation, an additional field (e.g., one bit) in the DCI may be use to signal that the triggered feedback is for an active state (e.g., '0' state) CC or a new state (e.g., '1') state CC.

Relationship with A-CSI-RS

In Rel-14, CSI-RS may be dynamically signaled by DCI. A UE receives an A-CSI request in subframe N. Additionally, CSI-RS is transmitted in subframe N as well. However, for the new state the UE is not monitoring the SCell in which the CSI-RS is transmitted. In an aspect, a grant received in subframe N indicates that CSI-RS transmission happens in subframe (N+k'−k) and CSI feedback happens in subframe N+k'. In another aspect, a UE cannot be configured with A-CSI-RS in new state.

Aperiodic-SRS

In certain aspects, especially for the case of TDD, it may be more efficient for the UE to transmit SRS than to measure and send CSI feedback. Similar ideas as discussed above for A-CQI may be applied for the A-SRS. In certain aspects, when the UE receives a DCI with an A-SRS trigger, the UE may perform measurements in the DL carrier to e.g. calculate pathloss and may set the uplink transmission for A-SRS feedback based on the DL pathloss measurement. It may be noted that this may not be needed, since pathloss filtering is longer term than CSI and the UE may have already measured in the past. Once the uplink power is set, the UE transmits A-SRS in the new state carrier. In certain aspects, the timeline for A-SRS may be the same as legacy timeline (e.g., no relaxation) or new timeline as discussed above for FDD & TDD LTE A-CSI reporting. For example, the UE may follow the legacy timeline (e.g., n+4 for FDD) if it does not need to measure DL carrier pathloss. In the other hand if the UE needs to measure the DL pathloss it may not be able to transmit A-CSI according to the legacy timeline and needs more time for the DL measurement. Thus, the UE may follow a relaxed timeline (e.g., n+k') to perform DL measurements and transmit the A-SRS based on that.

It may be noted that this may be combined with features of SRS carrier switching. For example, the SCell in new state may be a DL-only SCell, so the UE may retune the RF of another SCell or PCell to the corresponding carrier frequency, and transmit SRS.

PRACH

In certain aspects, different groups of SCells may be grouped in a different timing advanced group (TAG) and one TA command may be provided to SCells of each TAG. In an aspect, if the new state Scell is in a different TAG than the TAG of the SCell transmitting the A-SRS request, the problem is when to transmit (e.g., what TA to use) A-SRS transmission to avoid collisions. In an aspect, the Scell in the new state may be configured to send a RACH (Random Access Channel) to synchronize the UL SCell for UL A-SRS transmission.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication by a User Equipment (UE), comprising:
    receiving, a request for reporting an Aperiodic-Channel Quality Indicator (A-CQI) relating to a Secondary Cell (Scell) configured for the UE when the UE is in a first power state corresponding to the Scell, the first power state designed for a reduced SCell activation latency and to result in the UE using lower power as compared to when the UE is in a second power state;
    reporting, in response to the request, the A-CQI for the Scell in accordance with a first A-CQI reporting configuration for the first power state which is different from a second A-CQI reporting configuration for the second power state;
    receiving an indication that the request is to be received in a subsequent time window;
    measuring CQI for reporting during the time window;
    receiving the request during the time window; and
    reporting the A-CQI according to an A-CQI reporting timeline configured by the second A-CQI reporting configuration.

2. The method of claim 1, wherein the first A-CQI reporting configuration configures a first A-CQI reporting timeline that is more relaxed as compared to a second A-CQI reporting timeline configured by the second A-CQI reporting configuration.

3. The method of claim 2, wherein the first A-CQI reporting timeline provides the UE more time than the second A-CQI reporting timeline to report the A-CQI after receiving the request.

4. The method of claim 3, wherein the time the UE has in accordance with the first A-CQI reporting timeline to report the A-CQI after receiving the request at least includes a time taken by the UE to wakeup from a sleep state and measure CQI.

5. The method of claim 1, further comprising:
    receiving the request in subframe n, where n is an integer; and
    reporting the A-CQI corresponding to the request in subframe n+k, wherein the value of k is in accordance with the first A-CQI reporting configuration.

6. The method of claim 5, wherein the value of k in accordance with the first A-CQI reporting configuration is different from a value of k in accordance with the second A-CQI reporting configuration for the second power state.

7. The method of claim 5, wherein the first A-CQI reporting configuration configures different values of k for a Frequency Division Duplex (FDD) mode and a Time Division Duplex (TDD) mode.

8. The method of claim 7, wherein, for the TDD mode, the value of k is a function of a TDD Uplink/Downlink configuration configured for the UE and a downlink subframe in which the UE receives the request for reporting the A-CQI.

9. The method of claim 5, further comprising for a Frequency Division Duplex (FDD) mode, receiving an uplink grant for reporting the A-CQI in subframe n+k−m, wherein the value of m is the same as a value of k configured by the second A-CQI reporting configuration for the FDD mode.

10. The method of claim 9, wherein if the UE fails to decode the request in subframe n, further comprising:
    transmitting padding bits in subframe n+k based on the uplink grant.

11. The method of claim 5, further comprising:
    receiving the request and an uplink grant for reporting the A-CQI in the subframe n as part of a first Physical Downlink Control Channel (PDCCH) Downlink Control Information (DCI) with a Radio Network Temporary Identifier (RNTI) configured for the first power state.

12. The method of claim 11, wherein the UE receives the first PDCCH DCI along with a second PDCCH DCI with cell-RNTI (C-RNTI) configured for the second power state, wherein the second PDCCH DCI includes an uplink grant for transmission of uplink data.

13. The method of claim 11, further comprising for a Frequency Division Duplex (FDD) mode:
    receiving a second uplink grant for reporting the A-CQI in subframe n+k-m, wherein the value of m is the same as a value of k configured by the second A-CQI reporting configuration for the FDD mode; and
    reporting the A-CQI using the second uplink grant.

14. The method of claim 5, further comprising,
    if uplink resources are scheduled for transmitting data in subframe n+k, using the scheduled uplink resources to transmit the A-CSI multiplexed with the data.

15. The method of claim 5, further comprising for a Time Division Duplex (TDD) mode:
receiving an uplink grant for transmitting the A-CQI in a downlink subframe subsequent to subframe n; and
reporting the A-CQI using the received uplink grant.

16. The method of claim 1, wherein the UE switches to an active state at least corresponding to the Scell and remains in the active state during the time window.

17. The method of claim 1, further comprising measuring CQI in a valid subframe for the reporting.

18. The method of claim 1, further comprising:
receiving an indication of a subframe set to be used for measuring CQI in the first power state; and
measuring the CQI based on the indicated subframe set.

19. The method of claim 1, further comprising:
receiving the request in subframe n for reporting the A-CQI in subframe n+k;
receiving an uplink grant for transmitting data in subframe n+k in a different subframe; and
transmitting data punctured by uplink control information including the A-CQI.

20. The method of claim 1, further comprising:
receiving a second request for reporting a second A-CQI for a second SCell, wherein the UE is in the second power state corresponding to the second SCell;
reporting A-CQI for the SCell corresponding to the first power state according to the first A-CQI reporting configuration; and
reporting A-CQI for the second SCell corresponding to the second power state according to the second A-CQI reporting configuration.

21. The method of claim 1, wherein the second power state is a legacy Scell state.

22. A method for wireless communication by a User Equipment (UE), comprising:
receiving, a request for reporting an Aperiodic-Channel Quality Indicator (A-CQI) relating to a Secondary Cell (Scell) configured for the UE when the UE is in a first power state corresponding to the Scell, the first power state designed for a reduced SCell activation latency and to result in the UE using lower power as compared to when the UE is in a second power state, wherein the request is received in subframe n and wherein n is an integer; and
reporting, in response to the request, the A-CQI for the Scell in accordance with a first A-CQI reporting configuration for the first power state which is different from a second A-CQI reporting configuration for the second power state, wherein the A-CQI is reported in subframe n+x or later and wherein x is the time taken by the UE to wake up from a sleep state and measure CQI for the reporting.

23. A method for wireless communication by a User Equipment (UE), comprising:
receiving, a request for reporting an Aperiodic-Sounding Reference Signal (A-SRS) relating to a Secondary Cell (Scell) configured for the UE when the UE is in a first power state corresponding to the Scell, the first power state designed for a reduced SCell activation latency and to result in the UE using lower power as compared to when the UE is in a second power state; and
reporting, in response to the request, the A-SRS for the Scell in accordance with a first A-SRS reporting configuration for the first power state which is different from a second A-SRS reporting configuration for the second power state, wherein:
the first A-SRS reporting configuration configures a first A-SRS reporting timeline that is more relaxed as compared to a second A-SRS reporting timeline configured by the second A-SRS reporting configuration,
the first A-SRS reporting timeline provides the UE more time than the second A-SRS reporting timeline to report the A-SRS after receiving the request, and
the first A-SRS reporting timeline provides the UE more time than the second A-SRS reporting timeline to report the A-SRS after receiving the request.

24. A method for wireless communication by a Base Station (BS), comprising:
transmitting, to a User Equipment (UE), a request for reporting an Aperiodic-Channel Quality Indicator (A-CQI) relating to a Secondary Cell (Scell) configured for the UE when the UE is in a first power state corresponding to the Scell, the first power state designed for a reduced SCell activation latency and to result in the UE using lower power as compared to when the UE is in a second power state; and
receiving, in response to the request, the A-CQI for the Scell in accordance with a first A-CQI reporting configuration for the first power state which is different from a second A-CQI reporting configuration for the second power state,
wherein:
the first A-CQI reporting configuration configures a first A-CQI reporting timeline that is more relaxed as compared to a second A-CQI reporting timeline configured by the second A-CQI reporting configuration,
the first A-CQI reporting timeline provides the UE more time than the second A-CQI reporting timeline to report the A-CQI after receiving the request, and
the time the UE has in accordance with the first A-CQI reporting timeline to report the A-CQI after receiving the request at least includes a time taken by the UE to wakeup from a sleep state and measure CQI.

25. A method for wireless communication by a Base Station (BS), comprising:
transmitting, to a User Equipment (UE), a request for reporting an Aperiodic-Sounding Reference Signal (A-SRS) relating to a Secondary Cell (Scell) configured for the UE when the UE is in a first power state corresponding to the Scell, the first power state designed for a reduced SCell activation latency and to result in the UE using lower power as compared to when the UE is in a second power state; and
receiving, in response to the request, the A-SRS for the Scell in accordance with a first A-SRS reporting configuration for the first power state which is different from a second A-SRS reporting configuration for the second power state,
wherein:
the first A-SRS reporting configuration configures a first A-SRS reporting timeline that is more relaxed as compared to a second A-SRS reporting timeline configured by the second A-SRS reporting configuration,
the first A-SRS reporting timeline provides the UE more time than the second A-SRS reporting timeline to report the A-SRS after receiving the request, and
the first A-SRS reporting timeline provides the UE more time than the second A-SRS reporting timeline to report the A-SRS after receiving the request.

* * * * *